2,816,568

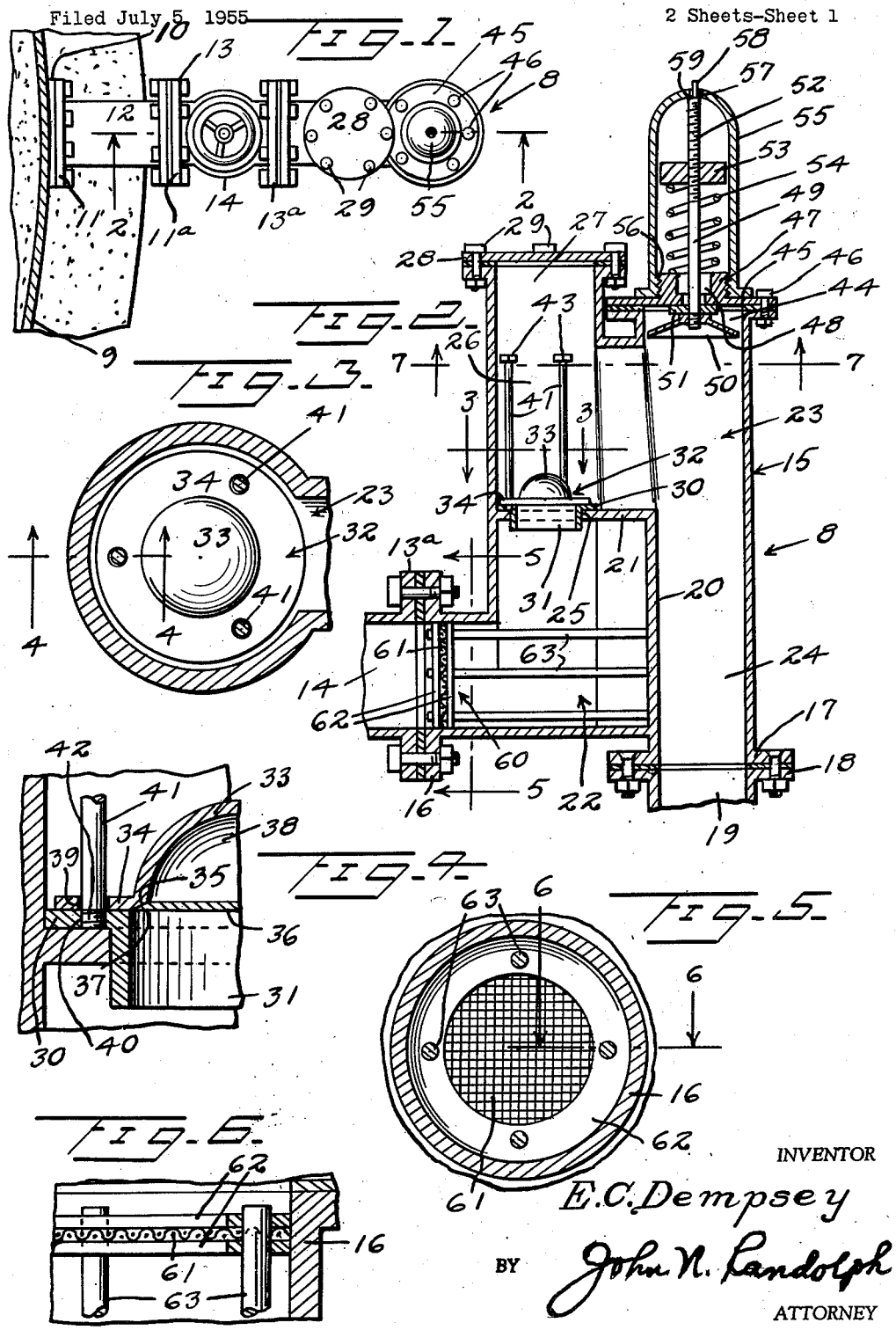
Dec. 17, 1957     E. C. DEMPSEY     2,816,568
AUTOMATIC SHUTOFF WITH GRAVITY ACTUATED FLOW VALVE
Filed July 5, 1955     2 Sheets-Sheet 1
INVENTOR
E. C. Dempsey
BY John N. Randolph
ATTORNEY Dec. 17, 1957 E. C. DEMPSEY 2,816,568
AUTOMATIC SHUTOFF WITH GRAVITY ACTUATED FLOW VALVE
Filed July 5, 1955 2 Sheets-Sheet 2
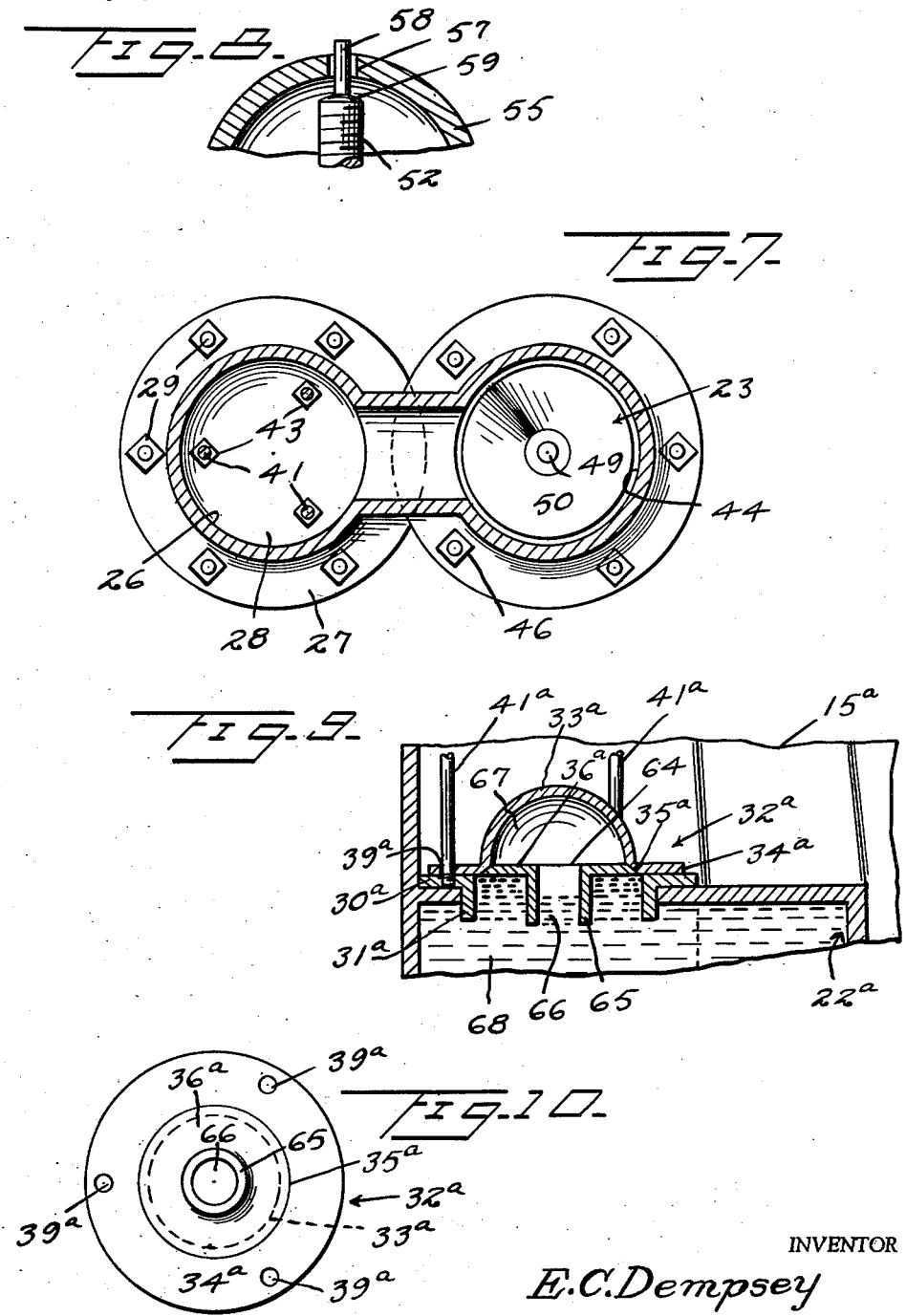
INVENTOR
E. C. Dempsey
BY John N. Randolph
ATTORNEY United States Patent Office 2,816,568
Patented Dec. 17, 1957

AUTOMATIC SHUTOFF WITH GRAVITY ACTUATED FLOW VALVE

Edward C. Dempsey, Pine Bluff, Ark.

Application July 5, 1955, Serial No. 519,883

6 Claims. (Cl. 137—399)

This invention relates to an automatic shutoff with a novel gravity actuated flow valve for use with storage tanks of flow lines for shutting off the flow from a storage tank to a pipe line when the liquid level of the tank falls to a predetermined point, to prevent air being drawn into the pipe line from the tank and which causes an air lock in the pipe line obstructing the flow of liquid from other tanks to which the pipe line is connected.

Another object of the invention is to provide an automatic shutoff which will prevent a back flow of liquid from a flow line into the tank.

A further object of the invention is to provide a novel automatic shutoff means which will not be rendered inoperative by an accumulation of gas above the valve.

A further and particularly important object of the present invention is to provide an automatic shutoff, the valve of which may be readily replaced so that gravity actuated valves of different weights may be utilized to obtain a most efficient functioning of the shutoff.

Still another object of the invention is to provide a shutoff the gravity actuated valve of which may be readily removed to enable filling of a storage tank through the outlet fitting thereof.

Various other objects and advantages of the invention will hereinafter become more fully apparent from the following description of the drawings, illustrating presently preferred embodiments thereof, and wherein:

Figure 1 is a top plan view, partly in horizontal section, showing the automatic shutoff in an applied position and connected to the outlet of a storage tank;

Figure 2 is an enlarged vertical sectional view, taken substantially along a plane as indicated by the line 2—2 of Figure 1;

Figure 3 is an enlarged fragmentary horizontal sectional view in detail, taken substantially along a plane as indicated by the line 3—3 of Figure 2;

Figure 4 is an enlarged fragmentary vertical sectional view, taken substantially along a plane as indicated by the line 4—4 of Figure 3;

Figure 5 is an enlarged detailed cross sectional view, taken substantially along a plane as indicated by the line 5—5 of Figure 2;

Figure 6 is an enlarged fragmentary horizontal sectional view, taken substantially along a plane as indicated by the line 6—6 of Figure 5;

Figure 7 is a horizontal sectional view, taken substantially along a plane as indicated by the line 7—7 of Figure 2;

Figure 8 is an enlarged fragmentary vertical sectional view, partly in elevation, of an upper part of the unit illustrating a different position of the parts;

Figure 9 is a fragmentary sectional view similar to a portion of Figure 2, on an enlarged scale, illustrating another form of the valve, and Figure 10 is a bottom plan view of the valve as shown in Figure 9.

Referring more specifically to the drawings, the improved automatic shutoff in its entirety and comprising the invention is designated generally 8. The present invention constitutes an improvement over my prior U. S. Patent No. 2,492,274, issued December 27, 1949, and entitled Automatic Shutoff for Storage Tanks of Flow Lines. The improved shutoff 8 is intended and adapted to function in the same environment as the automatic shutoff as disclosed in my prior patent. A portion only of one liquid storage tank 9 is illustrated. However, it will be understood that any number of tanks 9 may be provided, each of which is equipped with a shutoff 8 interposed in the connection between the storage tank and a gravity flow line, not shown, such as the flow line 6 of my prior patent. The tank 9 may correspond with either the tank 7 or 8 of my prior patent and is provided near the bottom thereof with a flanged outlet 10 to which is connected a flanged end 11 of a short inlet conduit 12 into which the liquid, not shown, passes directly from the storage tank 9. The opposite flanged end 11a of the conduit 12 is connected to a flanged end 13 of a conventional manually actuated valve 14 which is provided with a similar opposite flanged end 13a.

The automatic shutoff 8 includes a casing, designated generally 15 which, as best seen in Figure 2, is elongated vertically and which has a horizontally opening flanged inlet end 16 which is secured to the flanged outlet end 13a of the casing of the valve 14. Said inlet 16 of the casing 15 is located adjacent the lower end thereof. The casing 15 also includes a flanged outlet 17 which is located at the bottom thereof and laterally spaced from the inlet 16. Said outlet end 17 is secured to a flanged inlet end 18 of a conduit 19 which extends downwardly from the casing 15. The conduit 19 corresponds to the conduit 11 of my prior patent and is adapted to connect at its opposite end, not shown, to a flow line.

The hollow interior of the casing 15 is provided with a partition separating the inlet 16 from the outlet 17, which includes an upstanding wall portion 20 and a horizontal top wall portion 21. Said partition 20, 21 divides the casing 15 into chambers, designated generally 22 and 23. The chamber 22 opens through the inlet 16 and the chamber 23 has a depending outlet portion 24 which opens through the outlet 17. The top partition portion 21 has an opening 25 communicating with an upper part of the inlet chamber 22 and a top portion 26 of the chamber 23, which is disposed above said opening 25. The casing 15 has an externally flanged open upper end portion 27 constituting the upper part of the chamber portion 26 and the topmost portion of the casing 15 and which is normally closed and sealed by a removable cover plate 28 which is secured to the flanged opening 27 by fastenings 29.

A substantially flat annular valve seat 30 rests on the upper side of the partition part 21 around the opening 25 and has at its inner edge a depending annular flange 31 which fits in and extends downwardly from the opening 25. A gravity actuated flow valve, designated generally 32, is supported in a closed position thereof on the upper side of the valve seat 30.

The flow valve 32 comprises a hollow substantially hemispherical central dome portion 33 having at its bottom an outwardly projecting substantially flat annular flange 34 forming an integral part thereof. The flange 34, on its underside and at its inner edge, is provided with an annular beveled surface 35, as best seen in Figure 4. A thin plate 36, in the form of a disk, has a beveled edge 37 which fits flush against the beveled edge 35 and is suitably sealed thereto for completely sealing the chamber 38 formed by the dome 33 and plate 36. Before the plate 36 is completely sealed, the upper part of the dome 33 can be heated sufficiently for drying out the air within the chamber 38 to increase the buoyancy of the valve 32 or the buoyancy of the valve can be increased by evacuating the air from the chamber 38 to provide a partial vacuum therein when the sealing of the chamber is completed. The valve parts 33 and 34 are preferably formed of gray iron. If it is desired to weight the valve 32, the thickness of the parts thereof may be increased or a material having a higher specific gravity may be substituted.

The flange 34 is provided with equally spaced openings 39 which are disposed over and in alignment with smaller threaded openings 40, formed in the valve seat 30. Rods 41 extend loosely through the openings 39 and have threaded lower ends 42 which threadedly engage the openings 40. The rods 41 are of substantial length and are provided with heads 43 at their upper ends for slidably guiding the valve 32 in its movement toward and away from the valve seat 30.

The casing 15 has an externally flanged open top portion 44 which is disposed directly above the outlet portion 24 thereof and somewhat below the level of the part 27 and laterally spaced therefrom. Said open top portion 44 is provided with a cover plate 45 which is secured thereto by suitable fastenings 46. The plate 45 has an upstanding centrally disposed externally threaded boss 47 and is provided with a port or passage 48 which extends therethrough and through the boss 47. A valve stem 49 extends loosely through the port 48 and has an inverted dished shaped head 50 secured to its lower end and which is disposed within the casing 15 and which supports a sealing member or washer 51. The sealing member or washer 51 is mounted on the stem 49 directly above the head 50 and normally bears against the underside of the cover plate 45 for sealing the port 48 thereof. The stem 49 has an upper threaded portion 52 on which a nut 53 is threadedly and adjustably mounted to provide an adjustable stop for a spiral expansion spring 54. The spring 54 is disposed loosely around the stem 49 and has a lower end bearing on the upper end of the boss 47 and an upper end bearing against the underside of the nut 53.

An elongated cover 55 has an internally threaded open lower end 56 which threadedly engages the boss 47 for mounting the cover 55 above the plate 45, over the stem 49, spring 54 and nut 53. The cover 55 is otherwise closed except for a vent port 57 in the top central portion thereof. The valve stem 49 terminates at its upper end in a restricted stem portion 58 which extends upwardly through the vent port 57, when the sealing member 51 is held seated against the underside of the plate 45, and provides an upwardly facing shoulder 59, around the lower end of the stem portion 58, which seats against the underside of the top portion of the cover 55 for sealing the vent port 57.

A filter, designated generally 60, includes a filter element 61 which may comprise a disk of mesh wire fabric or other suitable filter material having a peripheral portion which is secured in any suitable manner between a pair of rings 62. A plurality of rods 63 have complementary ends extending through the rings 62 and the peripheral portion of the filter element 61, and project from said rings at substantial right angles to the planes thereof. The rods 63 are circumferentially spaced around the rings 62. The rings 62, supporting the filter element 61, fit slidably but relatively close within the inlet end 16 of the chamber 22 and the rods 63 extend inwardly from said rings and have ends, which are disposed remote from the rings, which are adapted to abut the partition part 20 for limiting inward displacement of the filter 60 into the chamber 22.

Assuming that the tank 9 contains a liquid such as oil to a level above that of the valve seat 30, pressure of the liquid will unseat and lift the valve 32 so that the liquid can flow from the chamber 22 into the chamber 23 and through the casing outlet 24 into the conduit 19. The filter 60 will prevent the passing of foreign matter into the chamber 22 and which might lodge on the valve seat 30 to prevent closing of the valve 32. The pressure required to lift the valve 32 will vary depending upon the buoyancy of the valve, as heretofore described.

When the level of the liquid in the tank 9 reaches a point only slightly above the level of the valve seat 30, the weight of the valve 32 will overcome the slight pressure in the chamber 22 so that the valve will return to its closed position as illustrated in Figure 2. Should a suction or partial vacuum thereafter occur in the chamber 23, the valve stem 49 will be drawn downwardly to open the port 48 and the vent port 57 so that air can enter the chamber 23 through these vent openings without unseating the valve 32 and which could otherwise result in lowering the liquid level in the tank 9 until air was drawn through the casing 15 into the conduit 19 and which would create an air lock and obstruct normal flow in the gravity line to which the conduit 19 connects.

The weight of the valve 32 can be varied so that a slight suction within the chamber 23 will not cooperate with a slight pressure in the chamber 22 to place the valve 32 in equilibrium so that liquid could seep past said valve into the chamber 23, after the liquid level in the tank has approached the level of the valve seat 30.

The chamber portion 27 provides a gas chamber located in the topmost part of the casing 15. Frequently in handling volatile liquids there is some separation of the lighter molecules and the chamber 27 is provided to receive these gases which might otherwise lodge above the valve 32 and by being compressed obstruct the opening of the valve.

The plate 28 is removable to provide an inspection opening to enable the valve 32, valve seat 30 and rods 41 to be removed and replaced as a unit. Additionally, these parts may be removed so that under certain circumstances the tank 9 can be refilled through its outlet conduit 12.

Figures 9 and 10 illustrate a modified form of the valve, designated generally 32a, and which may be utilized in lieu of the valve 32. The valve 32a includes a central substantially hemispherical upwardly extending dome portion 33a, corresponding to the valve portion 33, from the bottom edge of which projects a substantially flat annular flange 34a, corresponding to the flange 34. A substantially flat annular disk-like member 36a is secured at its periphery in any suitable manner, as indicated at 35a, to the inner edge of the flange 34a and the bottom portion of the dome 33a, as for example in the same manner that the plate 36 of the valve 32 is secured to the beveled surface 35. The joint 35a provides a liquid and airtight seal. The disk-like member 36 is provided with a central opening 64 defined by an integral annular depending flange or boss 65 which is open at its bottom to provide a bore or passage 66, the upper end of which opens into the hollow chamber 67 defined by the dome portion 33a, and the lower end of which opens downwardly.

The valve 32a is mounted in the same manner as the valve 32 on a valve seat 30a, corresponding to the valve seat 30, the depending flange 31a of which is substantially larger than the valve flange or boss 65, as seen in Figure 9. The valve 32a is guided in the same manner as the valve 32 by rods 41a, corresponding to the rods 41, and mounted in the same manner and which extend loosely through openings 39a of the valve flange 34a.

In Figure 9 the liquid from the tank 9 is shown at 68 filling the inlet chamber 22a of the casing 15a and extending upwardly into the flange 31a. It will also be apparent that a part of the liquid 68 will extend upwardly into the passage 66 to provide a liquid seal for the dome chamber 67, the liquid in said passage 66 being normally below the level of the liquid in the flange 31a, when the valve 32a is in a closed position, as seen in Figure 9. As the pressure of the liquid in the chamber 22a increases the valve 32a will be lifted from the valve seat 30a. Before the valve is actually lifted, the increased pressure of the liquid below the valve will cause the liquid to rise in the passage 66 for compressing the air in the chamber 67 to thus increase the buoyancy of the valve 32a. Thus, as the valve 32a is normally open and awash, the trapped air in the chamber 67 will be compressed sufficiently so that the valve 32a will be substantially buoyant. However, the degree of buoyancy of the valve 32a may be varied, in the same manner as previously described in reference to the valve 32, by increasing the thickness of the materials of which the valve is formed or by using materials having a higher specific gravity.

Various other modifications and changes are likewise contemplated and may obviously be resorted to, without departing from the spirit or scope of the invention as hereinafter defined by the appended claims.

I claim as my invention:

1. A safety shutoff for a storage tank comprising a hollow casing provided with a partition dividing the interior of said casing into an outlet chamber and an inlet chamber, said outlet chamber having an outlet end adapted to be connected to an outlet conduit, said inlet chamber having an inlet end adapted to be connected to a conduit leading from a storage tank, said partition having a substantially horizontal top portion provided with an opening connecting said chambers above the level of the outlet end and inlet end of the casing, a valve disposed within the outlet chamber above said horizontal partition portion for closing the opening thereof, and vertically disposed guide means supported by the partition and slidably engaged by said valve for guiding the valve in its reciprocating movement toward and away from said horizontal partition portion.

2. A safety shutoff as in claim 1, said valve having a hollow dome shaped upstanding central portion defining a buoyancy chamber.

3. A safety shutoff as in claim 2, and a plate forming a part of said valve for closing and sealing the open bottom of the buoyancy chamber thereof.

4. A safety shutoff as in claim 1, an annular valve seat supported on said horizontal partition portion around the opening thereof and having a depending annular flange extending through the partition opening, said valve seating on said valve seat in a closed position thereof, said guide means comprising rods fixed to and rising from the valve seat and extending loosely through said valve.

5. A safety shutoff as in claim 4, said outlet chamber having a topmost portion defining a gas chamber disposed directly above the upper ends of said guide rods.

6. A safety shutoff as in claim 5, and a removable cover plate closing and sealing the top of said gas chamber and removable to provide an inspection opening and to afford access to the interior or said outlet chamber for removing and replacing the guide rods, valve seat and valve as a unit.

References Cited in the file of this patent

UNITED STATES PATENTS

| | | |
|---|---|---|
| 758,970 | Jackson | May 3, 1904 |
| 1,156,274 | Cormeny | Oct. 12, 1915 |
| 1,704,501 | Force | Mar. 5, 1929 |
| 1,788,280 | Dempsey | Jan. 6, 1931 |
| 2,492,274 | Dempsey | Dec. 27, 1949 |
| 2,496,518 | Candler | Feb. 7, 1950 |
| 2,513,862 | Hart | July 4, 1950 |